Figure 1:
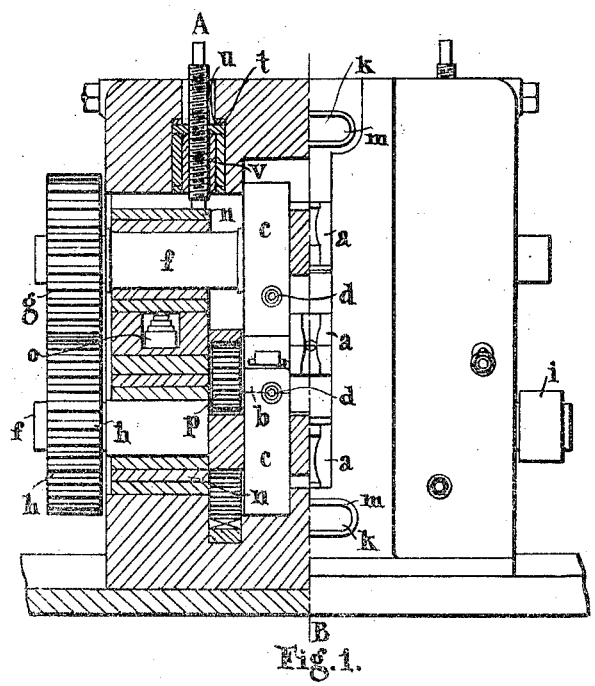

H. REINHARD.
MANUFACTURE OF METAL TUBES, RODS, OR THE LIKE.
APPLICATION FILED OCT. 30, 1903.

1,029,513.

Patented June 11, 1912.

8 SHEETS—SHEET 1.

Attest.
Benth. Stahl.
Edward N. Sarton

Inventor.
Henry Reinhard.
by Spear, Middleton, Donaldson & Spear
Atty's

H. REINHARD.
MANUFACTURE OF METAL TUBES, RODS, OR THE LIKE.
APPLICATION FILED OCT. 30, 1908.
1,029,513.
Patented June 11, 1912.
8 SHEETS—SHEET 3.
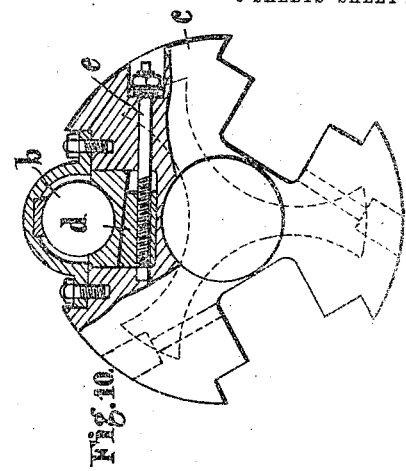
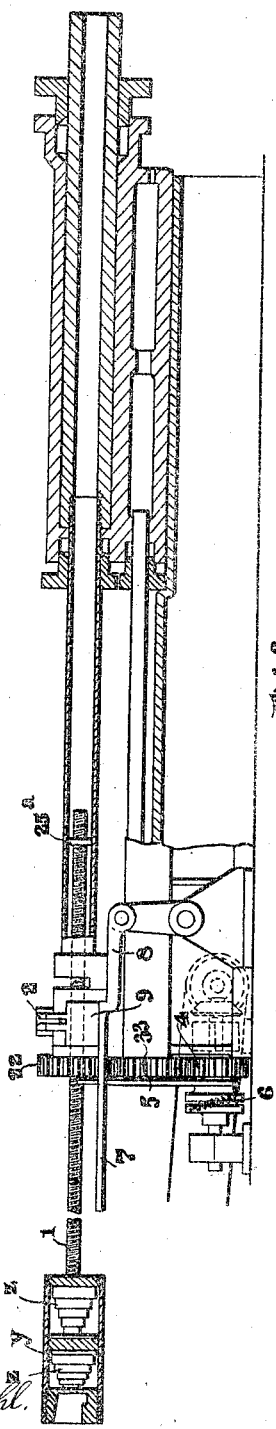
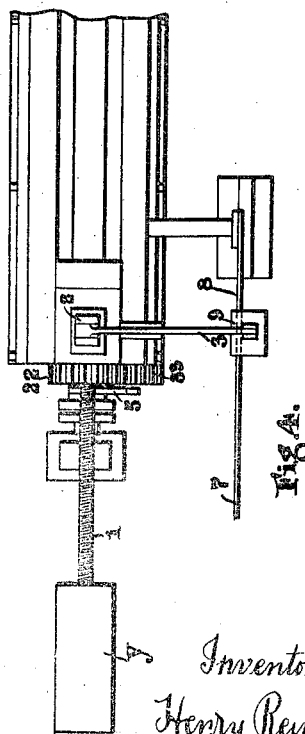
Attest.
Berth. M. Stahl.
Edward N. Sartor.
Inventor.
Henry Reinhard.
by Spear Middleton Donaldson & Spear
Atty's.

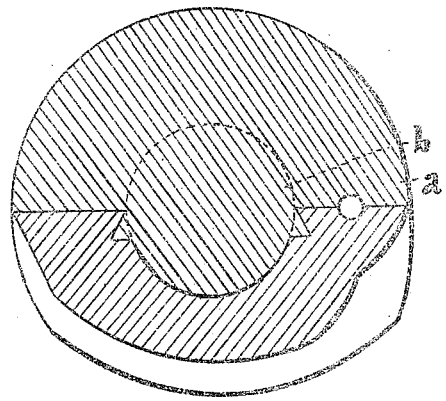
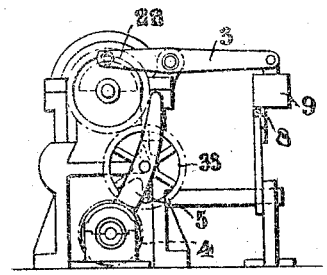
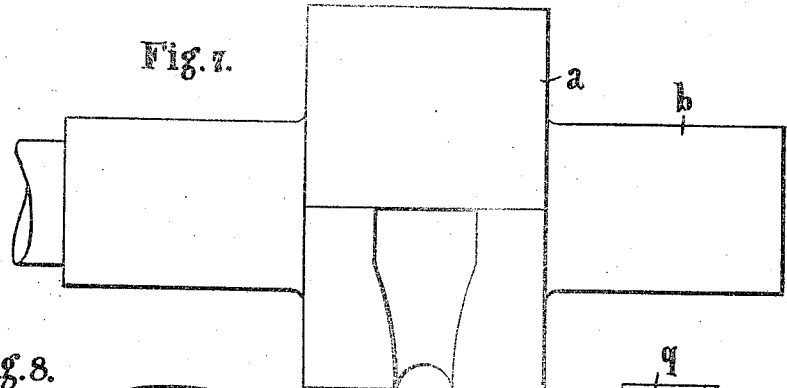
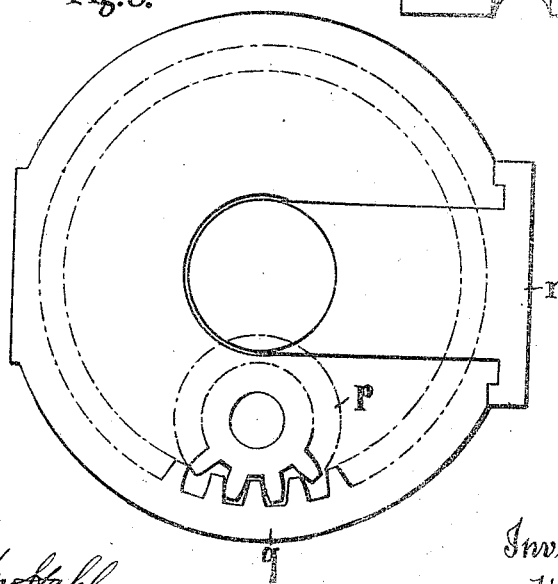
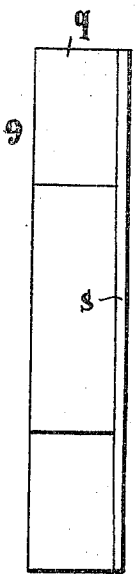

H. REINHARD.
MANUFACTURE OF METAL TUBES, RODS, OR THE LIKE.
APPLICATION FILED OCT. 30, 1908.
1,029,513.
Patented June 11, 1912.
8 SHEETS—SHEET 4.
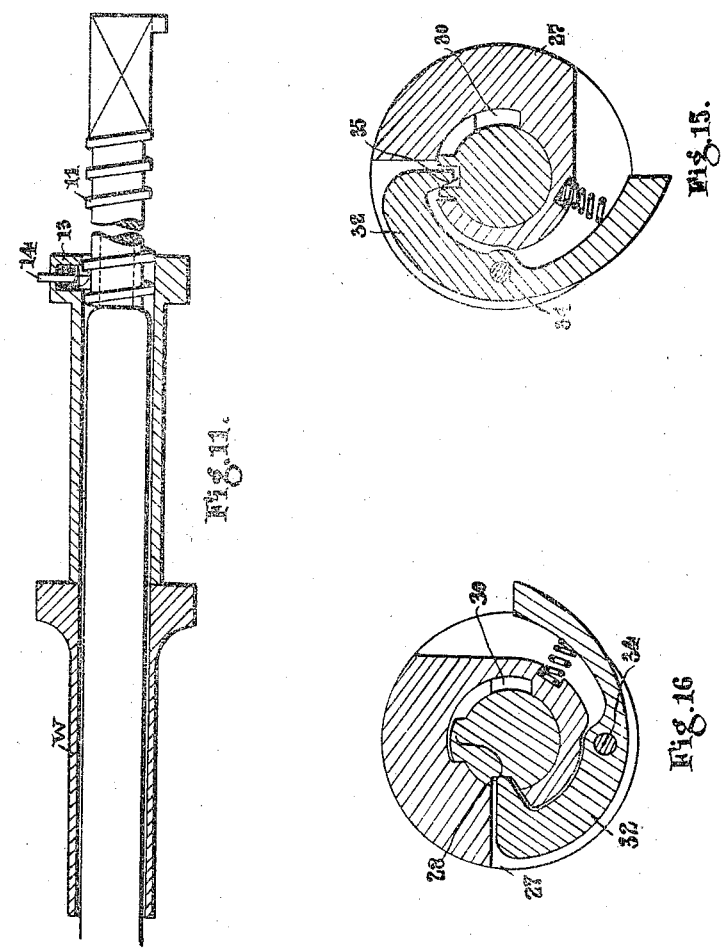
Attest:
Bent M. Stahl
Edward N. Sartou
Inventor.
Henry Reinhard
by Spear Middleton Donaldson & Spear
Atty's H. REINHARD.
MANUFACTURE OF METAL TUBES, RODS, OR THE LIKE.
APPLICATION FILED OCT. 30, 1908.
1,029,513.
Patented June 11, 1912.
8 SHEETS—SHEET 5.
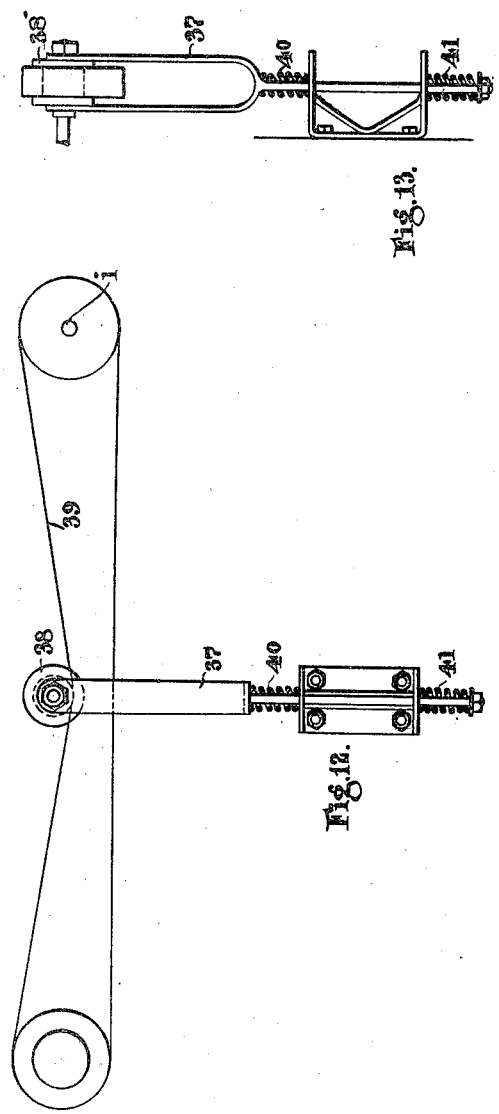
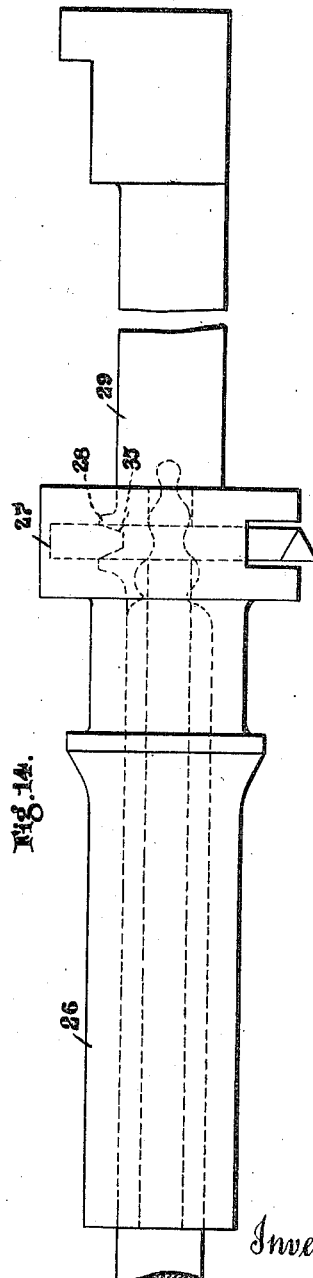
Attest.
Bent M. Stahl.
Edward N. Saxton.
Inventor.
Henry Reinhard.
by Shiar Middleton Donaldson & Shiar
Atty's.

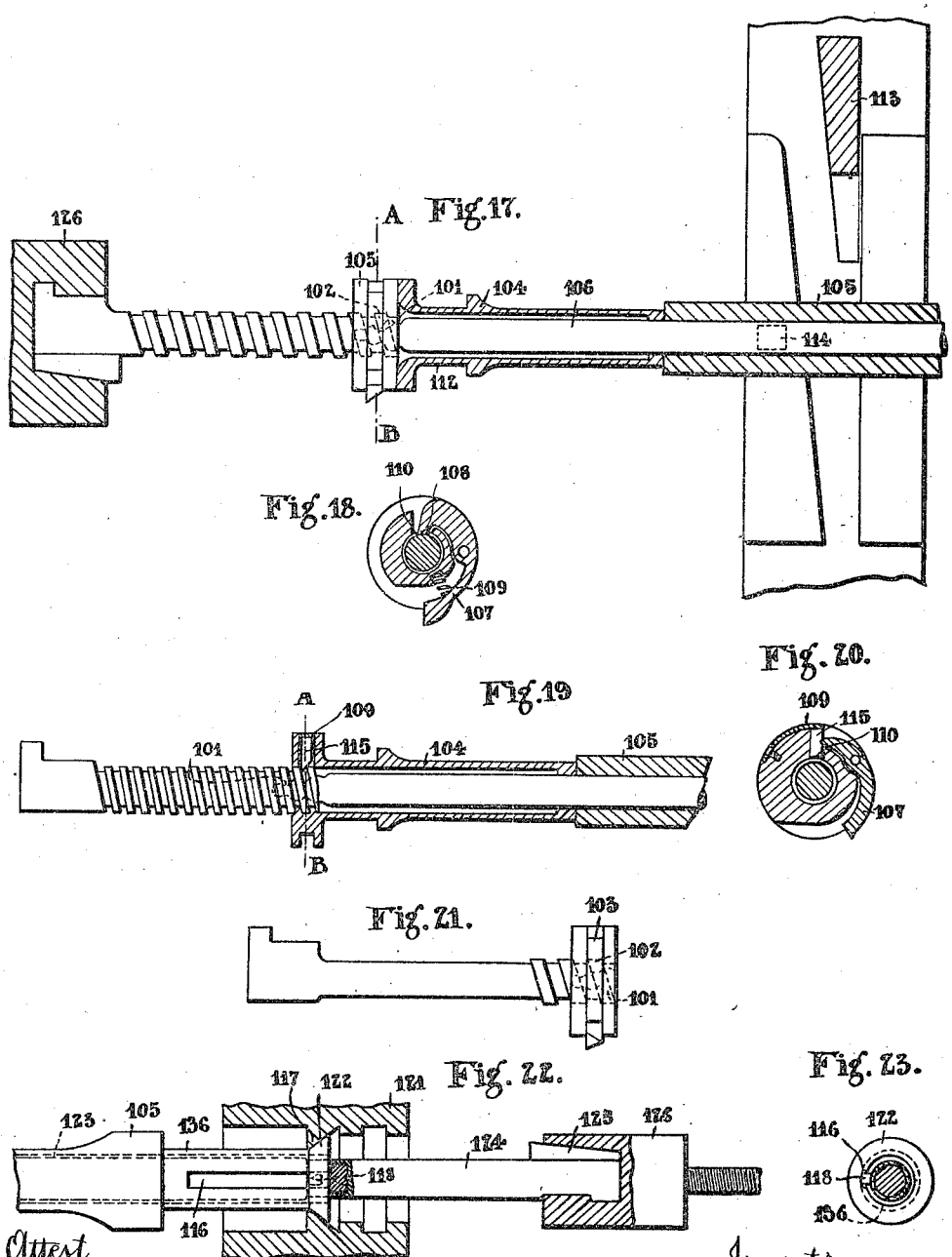

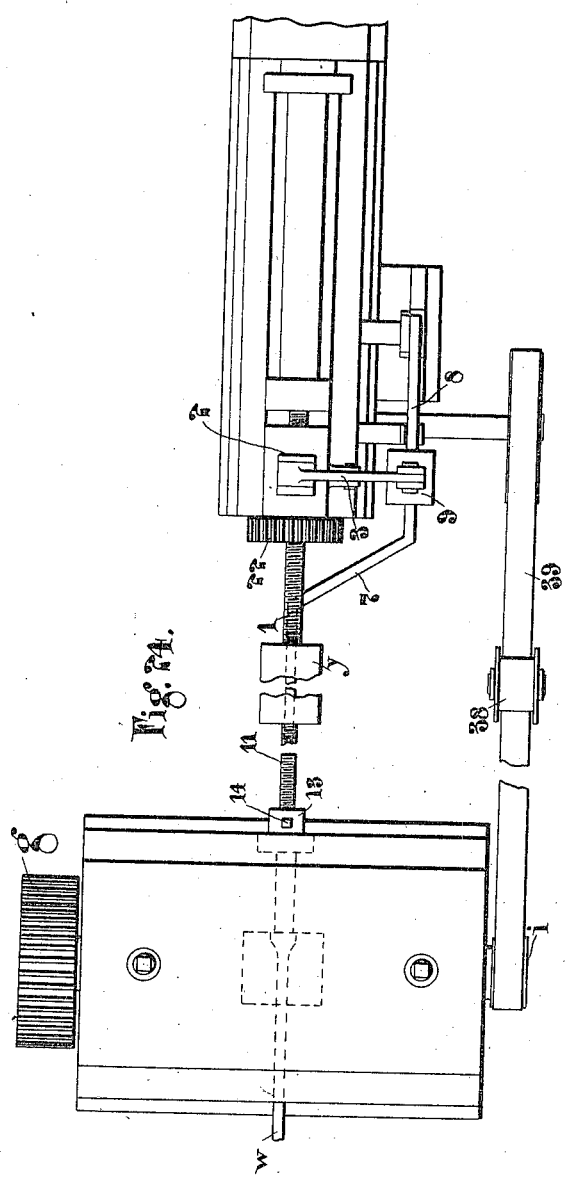

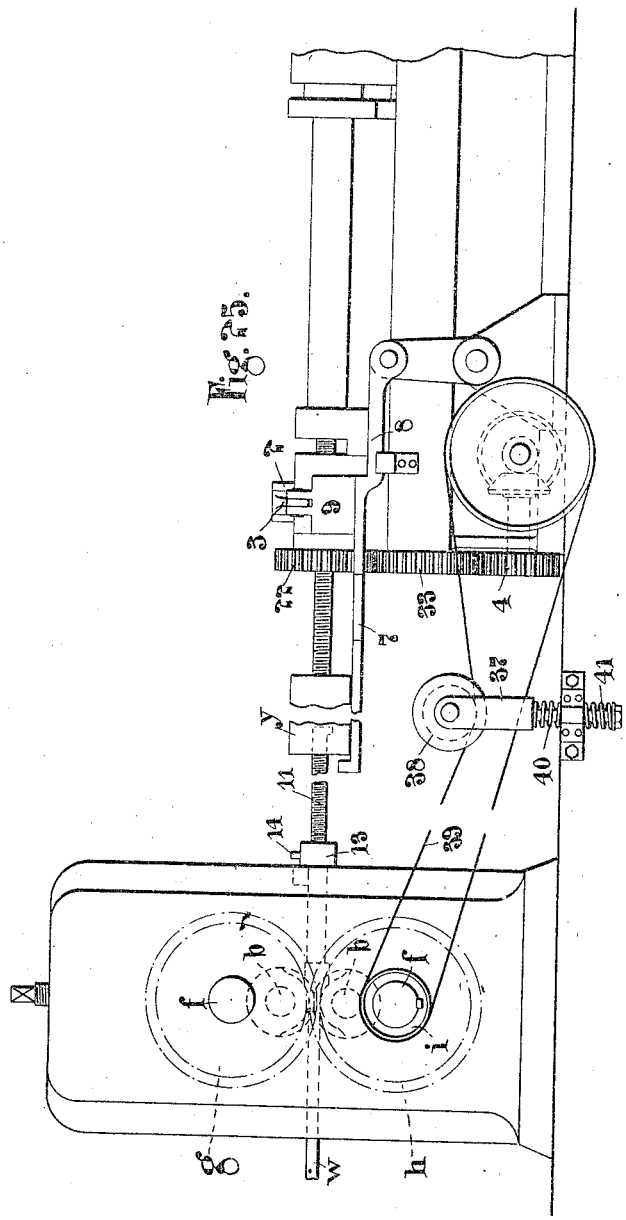

UNITED STATES PATENT OFFICE.

HENRY REINHARD, OF ASTON, BIRMINGHAM, ENGLAND, ASSIGNOR TO TUBES LIMITED, OF ASTON, BIRMINGHAM, ENGLAND.

MANUFACTURE OF METAL TUBES, RODS, OR THE LIKE.

1,029,513.      Specification of Letters Patent.      Patented June 11, 1912.

Application filed October 30, 1908. Serial No. 460,360.

*To all whom it may concern:*

Be it known that I, HENRY REINHARD, a subject of the King of Great Britain and Ireland, and residing at Catherine Street, Aston, Birmingham, in the county of Warwick, England, have invented certain new and useful Improvements in and Relating to the Manufacture of Metal Tubes, Rods, or the Like, of which the following is a specification.

This invention relates to the manufacture at high speeds of metal tubes, rods or the like by pilger rolls, namely rolls which are so shaped that they can progressively reduce the metal during one revolution, and more especially relates to such manufacture at speeds higher than those at present in use.

In the usual pilger roll processes of tube drawing or rolling the tube bloom or billet and mandrel connected with the mandrel spindle have a reciprocating motion through a considerable distance, being carried in one direction when the forging operation is taking place and returned in the other direction into position for the next grip while the gaps in the rolls are opposite one another; or the rolls and housings have the reciprocating motion while the tube bloom or billet is turned around for feeding. Owing to this reciprocation there is in each case a considerable time during which no work is being done on the metal, whence it follows that the metal becomes unduly lowered in temperature, the mandrel becomes hot and as a result it is softened and also the efficiency of the plant is lower than it should be. As an attempt to overcome this it has been proposed to use a number of pilger rolls adapted to act in sequence on the bloom or billet and to effect the advance and rotation of the workpiece or of the mandrel between the rolls by hand or by mechanical appliances such as screws. With hand feeding it is quite impracticable to obtain any substantial advantage as regards speed of pilgering combined with accuracy of the resulting product over the ordinary single pair mill because the material cannot be turned around equal increments at equal intervals of time unless the mill is running slowly. The net result of this is that a multi-roll mill with hand feed either gives no substantially increased output or gives an inferior tube. A plain screw feed also of itself cannot be used as auxiliary means must be provided for allowing the metal only to be fed while the bloom is not under compression and also for allowing it to be suitably turned. No suitable feeding means have therefore been suggested with the type of mill with the result that no practical multi-roll pilger mill has heretofore been known. It has also been proposed to subject to the action of rolls tubes and the like by passing a bloom on a mandrel between rollers having concentric grooves, a plurality of rollers being mounted in a framing so that they attack the bloom in sequence. In this form the bloom had a helical motion imparted to it, and while the work was engaged by the rollers its advancing motion was continuous. The idea of the helical motion was that a torsion should be put on the fibers of the metal. The main objections against this arrangement are as follows:—It is now known that a torsion put on the fibers of the metal deteriorates the same instead of improving it, and to this end the arrangement according to the present invention is such, that the fibers of the metal are not strained in any way. Further, the rollers with concentric grooves are of no practical use for tube making at high speeds, because they do not give sufficient reduction of the metal. Further, it is absolutely essential according to the present application that the feed of the metal should not be simultaneous with rolling, as it is in this prior proposal, but first feeding must occur and then rolling, otherwise no really useful result is obtained, the fibers of the metal become so distorted. It has also been proposed as an attempt to overcome the difficulties introduced by reciprocating mills, not to reciprocate the bloom but to move the rolls to and from the same. In overcoming the difficulty due to reciprocation of the bloom, it will at once be seen that a further difficulty and defect has been introduced namely, reciprocation of the rolls. The time taken to effect such reciprocation greatly detracts from the efficiency and utility of a mill, and the same becomes impracticable for high speed operation. Further in this proposal concentrically grooved rolls in rotating housings are employed and as has been explained above rolls with concentric grooves do not give a sufficient reduction of metal and pilger or eccentrically grooved rolls are necessary. Further in multi-roll mills as hitherto proposed no adjusting means have been provided for the individual rolls, with the result that should the rolls wear unevenly—for example through faulty oiling or unequal wearing brasses, the product is bulgy, or of uneven diameter, unless the defective roll is entirely removed from the mill and a fresh roll substituted—a matter which necessitates the mill being idle for a considerable time.

The object of this invention is to obtain a means for the substantially automatic and efficient production at exceptionally high speeds of metal tubes, rods or the like by pilgering, in a continuously and not reciprocally operated mill, free of the disadvantages referred to above.

The invention consists in a high speed pilger mill having a number of rolls adapted to act in sequence on the tube bloom or billet together with means for feeding the billet in a substantially automatic and continuous manner while the bloom is not being acted on by the rolls in order to obtain the desired product in an efficient manner at a high speed.

The invention consists more specifically in a pilger mill adapted for high speed working having a number of pilger elements adjustably carried in suitable rotating frames or housings, arranged to act in sequence on the bloom or billet, together with means for feeding in a substantially automatic and continuous manner, and if desired rotating, the bloom or mandrel during the time it is not being acted on by the rolls, with suitable resilient or like means interposed between the bloom or mandrel and the feeding devices, for the purpose of obviating unnecessary stress in the feed and mandrel connecting members and allowing suitable feeding.

The invention also consists in a combined mill and mandrel extractor.

The invention also consists in a means for allowing the metal to be worked to the end consisting in connecting the mandrel or like traveling device with an auxiliary device either partially or entirely screw threaded externally, or having bayonet catch or like means; and a spring nut either forming part of or separate from a pilger case or the like, arranged so that at a suitable time the auxiliary device may be caused to travel through the spring nut and pilger case, thereby feeding the mandrel forward until the whole of the metal is treated.

The invention also consists in the improved pilger mills hereinafter described.

Figure 2:
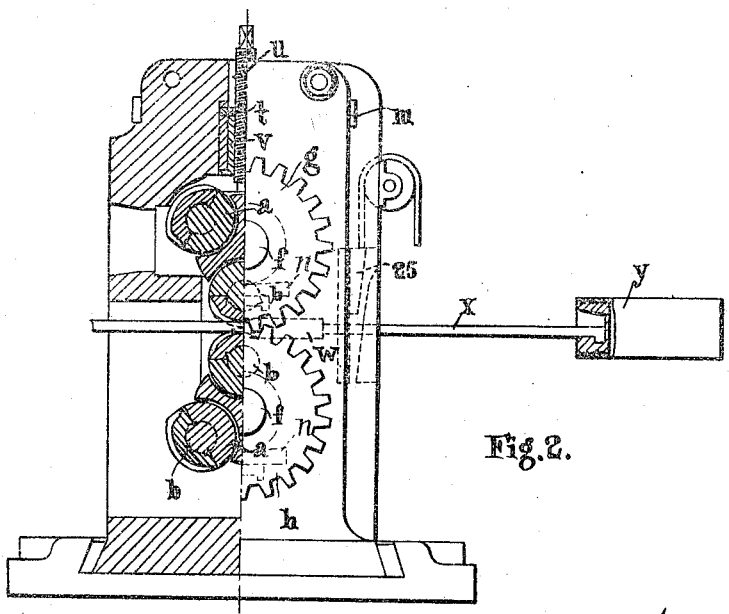

Referring to the accompanying drawings, Figure 1 is a front elevation partly in section of a mill according to one form of the invention. Fig. 2 is a partly sectional view on the line A B of Fig. 1; Fig. 3 is a view of the feeding and hydraulic part of the mill; Fig. 4 is a plan view of Fig. 3; Fig. 5 represents a side view of the feed arrangement; Figs. 6 and 7 are a section and side view respectively of a roll; Fig. 8 is an elevation showing the divided tooth ring; Fig. 9 is an end view of the divided ring; Fig. 10 shows an arrangement of the elements of the roll carrier; Fig. 11 represents an arrangement for allowing the billet or bloom to be pilgered throughout its entire length. Fig. 12 represents a side elevation of a belt tightening and loosening arrangement, and Fig. 13 represents an end view of the same. Fig. 14 shows a plan view of another form of arrangement for pilgering throughout the entire length of the bloom or billet, and Figs. 15 and 16 show section views of different forms of spring nuts for the purposes referred to above. Fig. 17 shows one method of carrying the invention into effect as regards working the bloom to the end. Fig. 18 shows a section on A—B of Fig. 17. Fig. 19 shows a modification having a combined pilger case and spring nut. Fig. 20 shows a section on A—B of Fig. 19. Fig. 21 illustrates a modified detail. Fig. 22 illustrates a form of bayonet arrangement. Fig. 23 is a detail view at right angles to Fig. 22. Fig. 24 shows an assembly view of certain features of the invention in plan and Fig. 25 shows an elevation of the same.

In the mill illustrated more particularly in Figs. 1–11, three pairs of pilger rolls, $a$, are mounted on axles, $b$, in housings, $c$, one of each pair being mounted in each housing. The rolls are preferably constructed as shown in Figs. 6 and 7, that is to say, so that the working part of the roll may be easily removed from the machine without affecting the other part, but they may be solid. The rolls are grooved as is usual with pilger rolls except that they need have no gap in view of the method of operation of this mill. The position of each roll axle is adjustable by means of wedge pieces, $d$, operated by screw means, $e$, in order that their relation to the bloom under compression may be varied if desired to counteract the effects of unequal wear of the rolls which may arise from various causes, and which in itself would produce bulgy tubes. The roll housings $c$ are mounted on main shafts $f$ having suitable bearings in the framework of the machine and are adapted to be driven in opposite directions, for example by gear wheels $g$ and $h$. It is found convenient to construct the housing in two parts and form projections, $k$, thereon, which are adapted to be held together by shrunk rings, $m$. The main axles, $f$, are also adjustable by parts $n$ which may be wedges, so that the sets of rolls may be brought nearer together or may be relatively separated, and springs, $o$, are provided to allow a certain amount of elasticity in working. On the roll axles, $b$, are mounted gear wheels, $p$, adapted to mesh with an internally toothed ring. This ring is constructed in two parts, $q$, and $r$, in order that the part, $r$, may be removed and so allow the rolls to be easily taken out without dismantling the main axles and the axles can be taken out without dismantling the whole of the structure. The ring also has a plate $s$ attached in the form shown only to one side. In the form illustrated one ring is arranged on each side of the machine in order to equalize the effects. The rings are substantially fixed in position during operation, that is to say, so as to allow the gear wheels, $p$, to act as planet pinions and cause rotation of the rolls themselves as the main axles rotate, but they are permitted to travel vertically in order to avoid unnecessary stresses. Should such stresses however occur and be transmitted to the main axle, they would in the form shown result in the shearing of a steel washer, $t$, placed between shearing members, $u$, and $v$, whereby the stress will be relieved before the rolls are damaged. The bloom, $w$, to be worked is placed by any suitable means on a mandrel, $x$, the end of which is adapted to fit into a recess in the feeder head, $y$, and to be definitely turned when that is rotated. The feeder head also contains springs, $z$, which allow a certain amount of resilience between the feed device and the bloom. To the front of the feeder head is attached the screwed rod, 1, suitably mounted and on which a segment of a nut, 2, can be placed or removed by means of a lever, 3. The rod, 1, is rotated by means of the toothed or friction wheels, 22, 33 and 4, driven through gearing, acting in conjunction with a key sunk in a longitudinal keyway in the rod. The wheels are adapted to be brought into operation or taken out of operation by means of a hand lever, 5, in order to control rotation, if desired. The feeding forward of the screwed spindle is effected when the segmental nut, 2, is in position. As the metal can only be fed when it is not being acted on by the rolls, and as it is preferable that the feeding arrangement should be continuously driven a spring coupling, 6, is introduced either on feeder head or on the counter shaft which takes up the feed by storing energy in the spring while the metal is under compression and dissipating it immediately the rolls leave the bloom. The effect of obtaining an intermittent feed from a continuous drive can also be obtained by using belt tightening and loosening arrangements.

In the form illustrated in Figs. 12 and 13 the arrangement consists of a large fork, 37, to the top end of which is attached a roller, 38. This roller is placed over the top of the belt, 39, and is arranged so that the belt is slacked to about the position shown at the bottom end of the fork are arranged springs, 40 and 41, which tend to hold the fork in the position shown. One of the pulleys is fastened on the main shaft $i$ of the mill, the other to the shaft 100—Figs. 12, 24 and 25. If the feeding spindle is now held still, as when the metal is under compression in the rolls, this pulley is held still, but as the pulley on the main shaft is continuously turning, the belt, 39, is tightened on the top side, and so the fork is drawn up thus tightening the bottom spring, 41. When the feeding spindle again rotates, this spring, 41, expands, and in addition to weight of fork, so pulls the fork down to its normal position, the top spring acting as a buffer. In order to stop feeding when the billet has reached the end of its travel a longitudinal rod, 7, is provided having a sunk or shouldered portion, 8, the rod being adapted to be caught by the feeder head $y$—as shown in Fig. 24—the billet or something moving in harmony therewith at the end of the operation. This causes the rod, 7, to be moved forward and to allow the weight 9 to drop into the part 8 and so through the lever 3 raises the nut off the screwed spindle.

Referring now to Fig. 11 in order that the bloom 12 may be pilgered to the end the connecting rod 11 is internally threaded to take the screwed end of the mandrel $x$. The rod 11 is also threaded externally and into the external threads a peg or pegs 14 is or are pressed by a spring. The peg 14 is so shaped that in moving the rod 11 and the mandrel $x$ from left to right, that is when withdrawing the mandrel the peg may jump the threads readily but cannot do so when the motion is in the opposite direction. In operation feeding progresses until the collar 13 in which the pegs 14 are held comes against a suitable stop shown diagrammatically as 114 when this collar is held from forward feeding and rotation of the rod 11 screws this rod and the mandrel through the sleeve bearing collar 13 and so feeds the bloom right through the rolls. A modified construction for this purpose is shown in Figs. 14 and 15. In this case the sleeve 26 is provided on the mandrel $x$ between the bloom and the feeder head. The end 27 of the sleeve is enlarged and carries a pin 32 pivoted at 34 and normally pressed by a spring into a recess 35 in a projection 28 on the part 29 connected with the feeder head, which part is internally screwed to receive the end of the mandrel $x$. During the main part of the operation the mandrel sleeve and connecting rod 29 rotate together. When, however, the enlarged head 27 has entered the frame of the mill sufficiently far it bears against a projection whereby the spring pressed pin 32 is released from the depression 35 and the rod 29 with the mandrel rotate until the projection 28 finds and enters the slot 30 after which it is fed along this slot and so the billet is worked to the end. In place of this the structures shown in Figs. 17–23 may be employed. In the form shown in Figs. 17 and 18, a socket, 101, screwed internally to receive the mandrel end, is attached to the feeder head, 126, by suitable means. This socket member is also externally threaded and on this external thread is screwed a spring nut, 103. Over the mandrel is slipped a pilger case, 104, of an internal diameter greater than the external diameter of the socket thread, which case is prevented from slipping over the socket thread by the spring nut, 103. The pierced or hollow metal billet, 105, is slipped over the mandrel, 106, until it comes into contact with the pilger case, 104, which is of such an external diameter that the billet can not slip over it. The spring nut in one form contains a lever, 107, suitably arranged so that one end of it, 108, may project into the thread of the nut, a spring, 109, acting to keep it normally in this position. A small hole, 110, is made in the thread near the end of the socket to allow the inner end, 108, of the nut lever, 107, to enter it. When the nut, 103, is screwed on, this end, 108, of the lever is sprung into the hole, 110, the nut being thus held in position so that it can be neither screwed nor unscrewed. If, however, the lever is now pressed so as to raise its inner end, 108, the nut may be then screwed up or unscrewed, the action of the spring, 109, simply being to press the inner end of the lever along the thread of the socket. As the operation of pilgering progresses the pilger case, 104, is fed nearer and nearer to the rolls until the recess, 112, in it comes opposite an extracting or like stop, 113, which is then dropped and so prevents the case from any substantial forward or backward motion. At the same moment the outer end of the nut lever is automatically depressed by a projection, 114, situate for example in the housings, and thus the inner end, 108, of the lever, 107, is raised and so frees the nut, 103, and allows it to be moved on the thread of the socket. The feeding is then continued, and, as the nut 103 is held still by the pilger case 104 and the projecting stop 114 in the housing, the socket member 101 is screwed right into the nut, 103, and so into the pilger case, 104. As the mandrel, 106, is screwed tightly to the socket, 101, when the socket travels forward the mandrel must travel with it and so the mandrel on which is the billet, 105, is screwed clear of the pilger case, 104, and thus enables the bloom to be pilgered to the end. In order to extract the mandrel, 106, from the tube the socket member, 101, and mandrel, 106, are suitably drawn back and the tube is thus pulled right against the pilger case, 104, which is firmly held by the extracting stop, 113. The socket, 101, nut, 102, and mandrel, 106, are thus withdrawn, the mandrel coming right through the tube and pilger case, 104, the tube being removed at the far side of the mill. The mandrel is then replaced by a fresh one, the pilger case slipped over it, the nut screwed back to its normal position and all is ready for another operation.

Various forms of sockets may be used and they may either be threaded throughout their entire length as in Fig. 17 or only partially so as in Fig. 21. Also a bayonet lock arrangement may be used if desired. One form of this is shown in Figs. 22 and 23 in which into the pilger head, 126, is first of all secured by means of a wedge, 125, to the short element, 124, into which is screwed the working mandrel, 123. A distance piece, 136, is fitted behind the billet, 105, and has a tapered ring end, 122. This distance piece also has a slot, 116, for nearly its whole length. At the end of the element, 124, is fitted a stud, 118, and when the operation commences, this stud is placed in such a position that it cannot enter the slot, 116. The distance piece, 104, and the mandrel, 123, turn together until the billet and the mandrel have entered the housing, 121, and the tapered portion of the ring on the distance piece, 104, meets with the resistance of a tapering projecting fillet, 122, fixed on the housing in its progression. The distance piece is then temporarily held by the forward pressure of the feed against the tapered surface of the fillet which prevents the ring continuing to turn, with the result that the stud, 118, which is revolving with the false mandrel, 124, being fixed on it, finds the slot, 116, which it enters and then travels up the same. Thus the billet can be pilgered right out for its whole length down to the diameter of the previously pilgered portion of the tube.

If desired, the pilger case and nut may be made in one piece, as shown in Fig. 19, the spring not being included in the flange at the back of the pilger case. Also instead of a nut lever as shown in Figs. 17 and 18, a modification as shown in Fig. 20 may be used, in which the end of a lever, 107, fits into a peg, 115, the spring, 109, being on top of the peg or in any other suitable position. The peg may be sprung into a small hole, 110, provided near the end of the socket, 101, when the pilger case, 104, is screwed on, and released as in the case of the separate nut described above. The peg, 115, is so shaped that when the socket, 101, and with it the mandrel, 106, are withdrawn—the extracting stop holding the pilger case—the peg may jump the threads. The extraction is proceeded with as above and the pilger case, 104, combined with the spring nut is then slipped over the new mandrel and screwed on the socket until the peg catches in the hole provided and is so held rigid. All is then ready for a new operation.

When it is desired to perform extraction of the mandrel after pilgering, in the mill referred to above—extracting means combined with rolling mills generally not being included in this invention—a wedge, 25, is provided adapted to be dropped between the billet and the mandrel and the latter extracted by means of an hydraulic ram or like device situate at some convenient part of the mill, for example, at the front as shown in the drawings.

It will be understood that many modifications may be made in the details of the mills described without departing from the spirit of the present invention as defined by the appended claims.

The rolls may be shaped according to the sizes shape or thickness it is desired to obtain in the finished metal product, and any suitable number of pilger rolls may be used.

By means of the arrangements described above, the speed of working may be greatly increased with many advantageous results, and a better product obtained, and that in an efficient manner.

Having now described my said invention what I claim as new and desire to secure by Letters Patent is:—

1. Means for rolling a mass of metal comprising rotatable housings, pilger rolls mounted in said housings, gear pinions connected with said rolls and meshing with an internally toothed wheel for the purpose of driving the rolls when the housings rotate, and mechanical means disposed behind the rolls for the purpose of intermittently forcing the metal to the same, and of enabling high speed working to be obtained; as set forth.

2. Means for rolling a mass of metal comprising rotatable housings, power driven pilger rolls mounted in said housings, and power means disposed behind said rolls for the purpose of intermittently moving the metal in one direction only, toward the rolls for the purpose of enabling high speed working to be obtained; as set forth.

3. Means for rolling a mass of metal comprising rotatable housings, pilger rolls mounted in said housings, a continuously power operated driving shaft, a driven feed shaft, and a spring coupling connecting said driving shaft and said feed shaft for the purpose of intermittently and in one direction only moving the metal to force it to the rolls; as set forth.

4. Means for rolling a metal bloom for forming a tube or the like including rotatable housings, pilger rolls mounted in said housings arranged to operate on the bloom longitudinally, and wedges for the pilger rolls for the purpose of individually adjusting them for wear; as set forth.

In testimony whereof, I affix my signature in presence of two witnesses.

HENRY REINHARD.

Witnesses:
CHARLES EDWARD COPE,
HENRY HERBERT OLIVER.